United States Patent [19]
Uchiyama et al.

[11] Patent Number: 5,851,060
[45] Date of Patent: Dec. 22, 1998

[54] PROJECTIVE DISPLAY DEVICE

[75] Inventors: Takayuki Uchiyama; Atsushi Kawahara, both of Yokohama, Japan

[73] Assignee: Nikon Corporation, Tokyo, Japan

[21] Appl. No.: 713,966

[22] Filed: Sep. 12, 1996

[30] Foreign Application Priority Data

Sep. 13, 1995 [JP] Japan ................................ 7-235686
Sep. 13, 1995 [JP] Japan ................................ 7-235687

[51] Int. Cl.⁶ .................................................. G03B 21/14
[52] U.S. Cl. ........................................ 353/94; 353/82
[58] Field of Search ............................ 383/82, 83, 71, 383/94, 119, 122, 32, 7, 9

[56] References Cited

U.S. PATENT DOCUMENTS 3,792,922  2/1974  Fouruie .................................. 353/83
5,325,137  6/1994  Konno et al. ......................... 353/98
5,428,415  6/1995  Kellan et al. ......................... 353/82

FOREIGN PATENT DOCUMENTS 6-59239  3/1994  Japan .
7-28164  1/1995  Japan .

OTHER PUBLICATIONS

English–language abstract of 6/59239.
English–language abstract of 7–28164.

*Primary Examiner*—William Dowling
*Attorney, Agent, or Firm*—Oliff & Berridge, PLC

[57] ABSTRACT

A projective display device can function as a video projector and a slide projector. The device is compact, easy to use and simple in operation. A video projector that projects video information can be used as a slide projector by utilizing a reflection type spatial light modulator in a reflected state when a photographic film is held in the optical system of the projector. Alternatively, a moveable mirror can be used to switch from a video projector to a slide projector.

24 Claims, 6 Drawing Sheets

PROJECTIVE DISPLAY DEVICE

BACKGROUND OF THE INVENTION

1. Field of the Invention

The present invention relates to a projective display device that projects information of images.

2. Description of Related Art

Conventionally, when presentations are made in a conference room or the like, a video projector is used if video information is required, and a slide projector is used if information using photographic films is required. Because each of the video information and the photographic films has its own characteristics, it is disadvantageous to use only one of them. Namely, the video information can show moving images, which may be transmitted between distant locations through computers, for example. On the other hand, the information using photographic films is superior in reproductivity of images (i.e., image quality).

Therefore, both kinds of information are often required in a presentation, which requires the use of both a video projector and a slide projector. However, when both the video projector and the slide projector are used, each device has to be controlled separately. As a result, control of the devices is complicated and space requirements are large.

When video information and information in photographic films must be projected in a presentation using only a video projector, the photographic films have to be scanned and read into a computer as electronic data, and then the information is projected with the video projector. In addition, in order to change the photographic films into electronic data by scanning and reading them into the computer, an expensive computerized scanner device is required. Again, control is more complicated, and the space that the devices require is large. Also, the photographic information that is converted into electronic data is inferior in reproductivity and resolution as compared to the originals. If the resolution of the electronic data is increased to solve this problem, the amount of data required to be stored becomes huge, creating additional problems.

SUMMARY OF THE INVENTION

It is an object of the present invention to provide a projective display device that functions as a video projector and as a slide projector while being compact and easy to use.

In order to achieve the above and other objects, and to overcome the shortcomings in the prior art, a projective display device according to embodiments of the invention includes both an optical system that projects video information (e.g., a video display) and an optical system that projects images from photographic films (e.g., a slide projector). In one embodiment, switching between the video projector optical system and the slide projector optical system is accomplished by changing a reflection type spatial light modulator (SLM) between a reflected state and a modulated state. When functioning as a video projector, the SLM is in a modulated state, the SLM being modulated by a video signal that controls the modulated state. When functioning as a slide projector, the SLM is in its reflected state. This occurs when a photographic film is detected to be present in the light path.

In another embodiment, switching between the video projector optical system and the slide projector optical system can be accomplished using movable reflection mirrors. In particular, movable reflection mirrors can be utilized to selectively direct light from a light source between two different paths, the first path being through a film and the slide projector (or film) optical system, and the second path being through the video optical system, preferably containing an SLM.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

In the projective device of the present invention, an optical system for a video projector and an optical system for a slide projector are provided in one (i.e., a single) casing 10 in which a light source 1 and a projection lens are shared by the video and slide projectors. The optical system for the slide projector uses the reflected state of the reflection type spatial light modulator (SLM). As a result, the device includes a slide insertion mechanism added to the video projector to enable use of the video projector.

Switching from the optical system of the video projector to the optical system of the slide projector can be accomplished by moving a movable reflection mirror to switch the path of the light through the device. As an alternative, the SLM can be switched between a modulated state and a reflected state for the device to switch between functioning as a video projector and a slide projector. The increase in image brightness that occurs when switching from the optical system of the video projector to the optical system of the slide projector can be diminished by using an ND (neutral density) filter and/or a converting filter for color temperature.

For more details on projective optical systems that utilize SLMs, see, for example, U.S. Pat. No. 4,127,322, U.S. Pat. No. 4,343,535 and U.S. Pat. No. 5,379,135. The disclosures of U.S. Pat. Nos. 4,127,322, 4,343,535 and 5,379,135 are incorporated herein by reference in their entireties. The devices disclosed in these patents do not provide slide projection capabilities.

Embodiment 1

Figure 1:
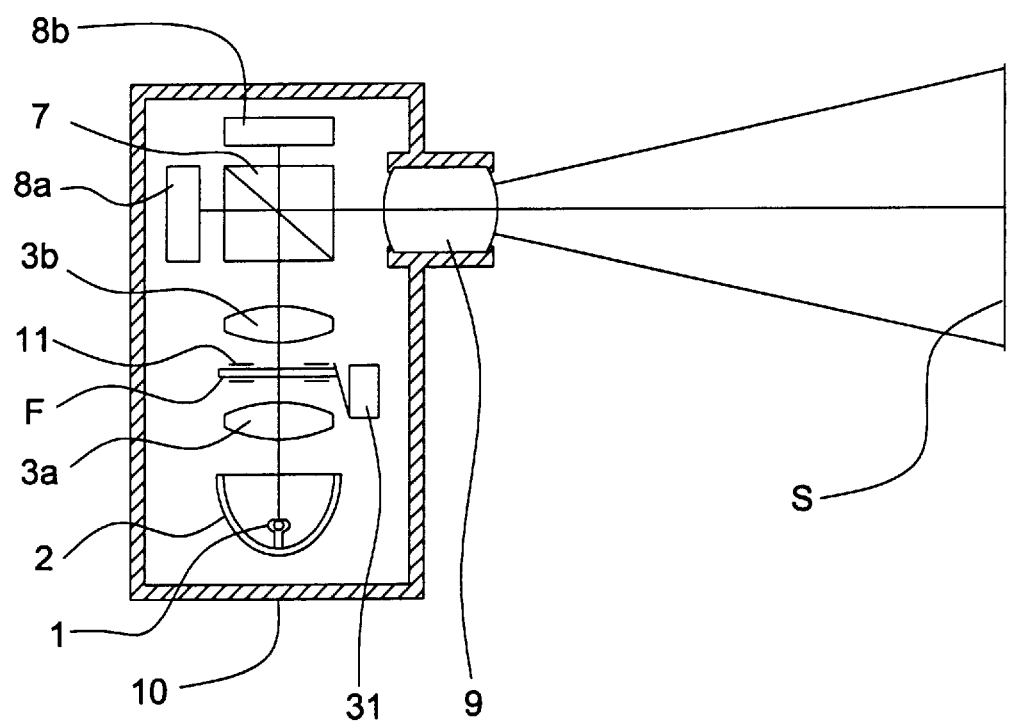
FIG. 1 is a side schematic view of a first embodiment of an optical system of the present invention.

FIG. 1 is a side schematic view of a first embodiment of the present invention. Light emitted from a light source 1 becomes substantially collimated light after being reflected by a reflection mirror 2 and passing through a relay lens 3a. The substantially collimated light then passes through a second relay lens 3b and is transmitted to a polarized beam splitter 7.

S polarized light is reflected by the polarized beam splitter 7, modulated and reflected by a first SLM 8a, passes through beam splitter 7 and is projected to a screen S by a projection lens 9. The P polarized light transmitted through a second relay lens 3b passes through beam splitter 7, is modulated and reflected by a second SLM 8b, is reflected by beam splitter 7, and then is projected to screen S by projection lens 9. Thus, two reflection type SLMs 8a and 8b are used to reflect both the P polarized light and the S polarized light from the polarized beam splitter 7 to the projection lens 9, and ultimately to the screen S. Projection of both P polarized light and S polarized light to the screen S achieves a brighter image than is possible with the technique of projecting only the S (or only the P) polarized light.

When the device is used as a slide projector, a film F (i.e., a slide) is inserted in a film holder 11 between the relay lenses 3a and 3b, and the SLMs 8a and 8b are placed in a reflected state. As a result, the light transmitted through the film F is transmitted through the polarized beam splitter 7. An image from the film F is formed on the SLMs 8a and 8b and is fully reflected therefrom and ultimately projected to the screen S by the projection lens 9.

When the device is used as a video projector, incidence of unnecessary light on the SLMs 8a and 8b is avoided due to a rectangular opening in the film holder 11. When used as a video projector, the device functions basically in a conventional manner as described, for example, in the above-incorporated U.S. patents. The SLMs 8a and 8b are supplied with video signals so that they are modulated in a modulated state. The image that is projected to screen S varies depending on the portion of the SLMs 8a and 8b that are reflecting light.

When the film F is inserted into the casing 10 of the device, and in particular into the film holder 11, a detection means 31 such as a switch detects presence of the film F, which causes the SLMs 8a and 8b to be switched to their reflected state. As a result of this reflected, the light transmitted through the film F forms an image on the SLMs 8a and 8b and is projected through the projection lens 9. The relay lens 3b improves performance of forming images when the film F is inserted. The relay lens 3b also controls the light that enters the SLMs 8a and 8b when the film F is not inserted.

As described above, by using the reflected state of the SLMs 8a and 8b, two optical systems for the video projector and the slide projector with one light path is possible. As a result, the number of parts is minimized, making optical adjustments easy because major optical parts are not required to be moved. In addition, assembly of the device at the time of manufacturing is made easier.

Furthermore, certain considerations are no longer necessary, such as equalizing an optical distance from the projection lens 9 to the SLMs 8a and 8b and a distance from the projection lens 9 to the film F.

An additional relay lens can be provided between the projection lens 9 and the polarized beam splitter 7 (instead of using the relay lens 3b between the film F and the polarized beam splitter 7) to focus an image produced by the film F and the SLMs 8a and 8b by adjusting the focal point of the additional relay lens.

Embodiment 2

Figure 2:
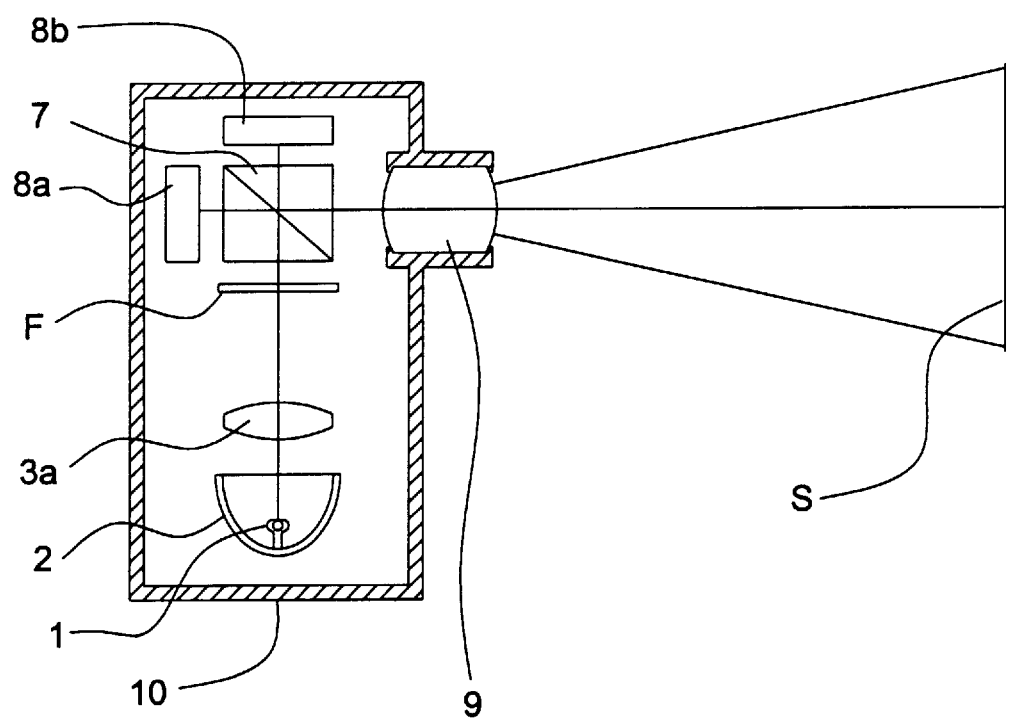
FIG. 2 is a side schematic view of a second embodiment of an optical system of the present invention.

FIG. 2 is a side schematic view of a second embodiment of an optical system of the present invention. Light is emitted from the light source 1 and becomes substantially collimated light after being reflected by the reflection mirror 2 and passing through the relay lens 3a. The light reflected/ transmitted by/through the polarized beam splitter 7 is projected to the screen S by the projection lens 9 after being modulated and reflected by the SLMs 8a and 8b as detailed above.

When the device is used as a slide projector, a film F is inserted between the relay lens 3a and the polarized beam splitter 7, and the SLMs 8a and 8b are placed in a reflected state. As a result, the light transmitted through the film F is transmitted through, or reflected by, the polarized beam splitter 7. An image is formed on the SLMs 8a and 8b and is fully reflected. Then, after being reflected by, or passing through, the polarized beam splitter 7, the image is projected to the screen S by the projection lens 9.

Because the second embodiment is simplified by omitting a relay lens, the device is more compact, and less costly. In addition, by making the projection lens 9 a focal point adjustable lens, and by switching its focusing point to the film F or to the SLMs 8a and 8b, according to whether the video projector or the slide projector is being used, projected images have good overall quality and resolution when an optical distance from the projection lens 9 to the film F is appropriately equalized.

In addition, because the SLMs 8a and 8b operate as reflected mirrors when in the reflected state, even if images are not formed on the SLMs, fine quality projected images can be obtained by adjusting the focusing point of the projection lens 9 to focus on the surface of the film F.

Although not shown, this second embodiment preferably also includes a film holder and a switch or other sensor to detect presence of film in the device so as to cause the SLMs to switch to their reflected state.

Embodiment 3

Figure 3:
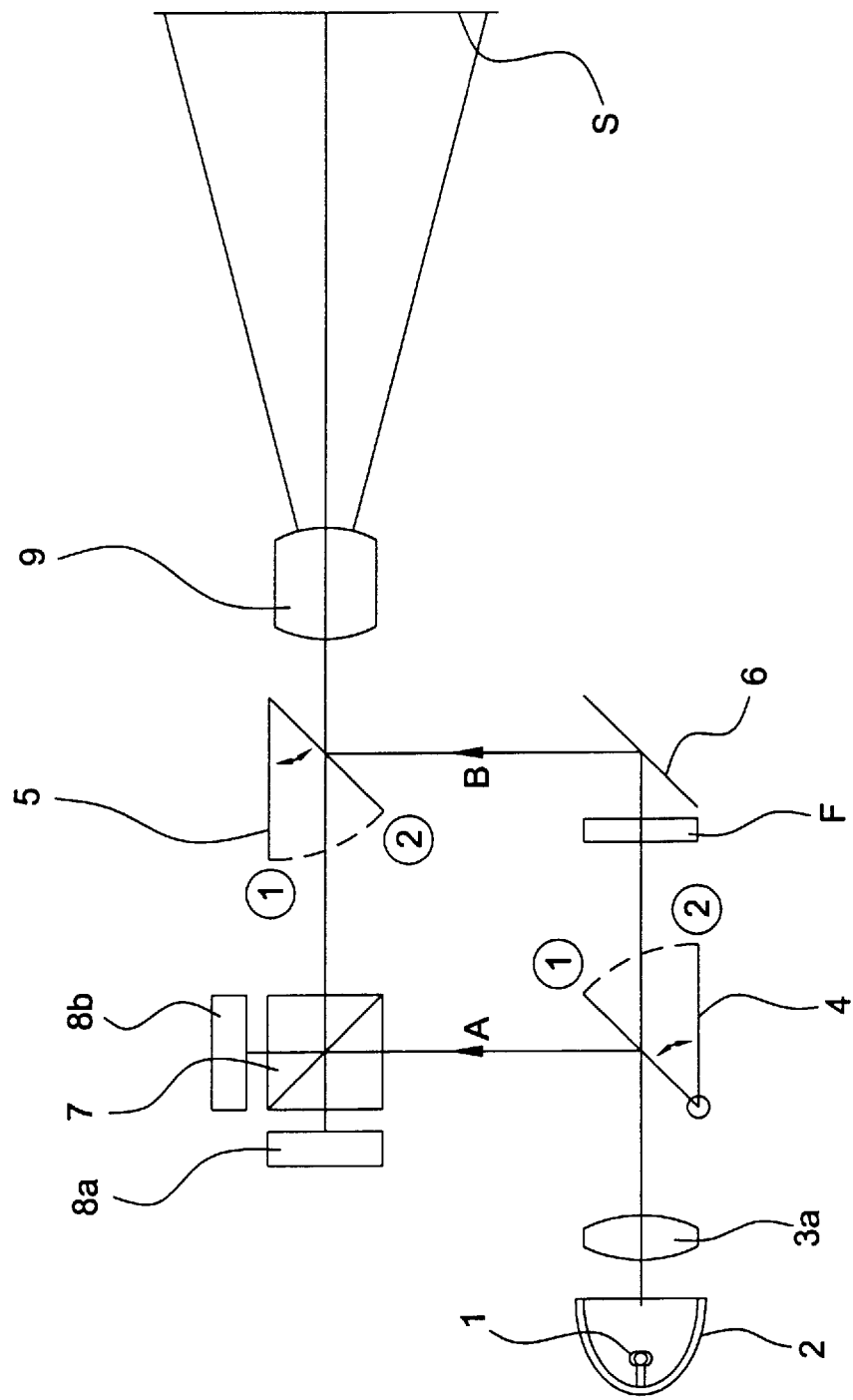
FIG. 3 is a side schematic view of a third embodiment of an optical system of the present invention.

FIG. 3 is a side schematic view of an optical system of a third embodiment of the present invention. When the FIG. 3 device is used as a video projector, light emitted from a light source 1 becomes substantially collimated light after being reflected by a reflection mirror 2 through relay lens 3a. The light is then reflected by a movable mirror 4 set at a position indicated as (1) to follow a light path A. Then, light transmitted through, or reflected by, a polarized beam splitter 7 is modulated and reflected by SLMs 8a and 8b. The light is then reflected by, or transmitted through, the polarized beam splitter 7 and projected to a screen S by a projection lens 9 (a movable mirror 5 is set at the position indicated as (1)).

When the device is used as a slide projector, the movable mirror 4 is moved out of the light path by setting it at a position indicated as (2). The light is transmitted through a photographic (slide) film F, and is reflected by a mirror 6 to follow a light path B. The light is then reflected by the movable mirror 5, which is set at the position indicated as (2) and projected to the screen S by the projection lens 9.

At this time, an optical distance from the projection lens 9 to the SLMs 8a/8b and an optical distance from the projection lens 9 to the film F are made equal, and an optical distance from the light source 1 to the SLMs 8a/8b and an optical distance from the light source 1 to the film F are made equal. By forming the optical distances as set forth above, major optical parts, such as the light source 1, the polarized beam splitter 7, the SLMs 8a/8b and the projection lens 9, are not required to be moved, and optical adjustments are unnecessary at the time of switching from the function of video projector to the function of slide projector. As a result, the switching mechanism is very simple. Moreover, since the movable optical parts necessary for manufacturing are small, assembly is made easy.

If the optical distance from the projection lens 9 to the SLMs 8a/8b and the optical distance from the projection lens 9 to the surface of the film F cannot be equalized, focusing the projected images is corrected by adjusting the focal length of the projection lens 9.

Figure 4:
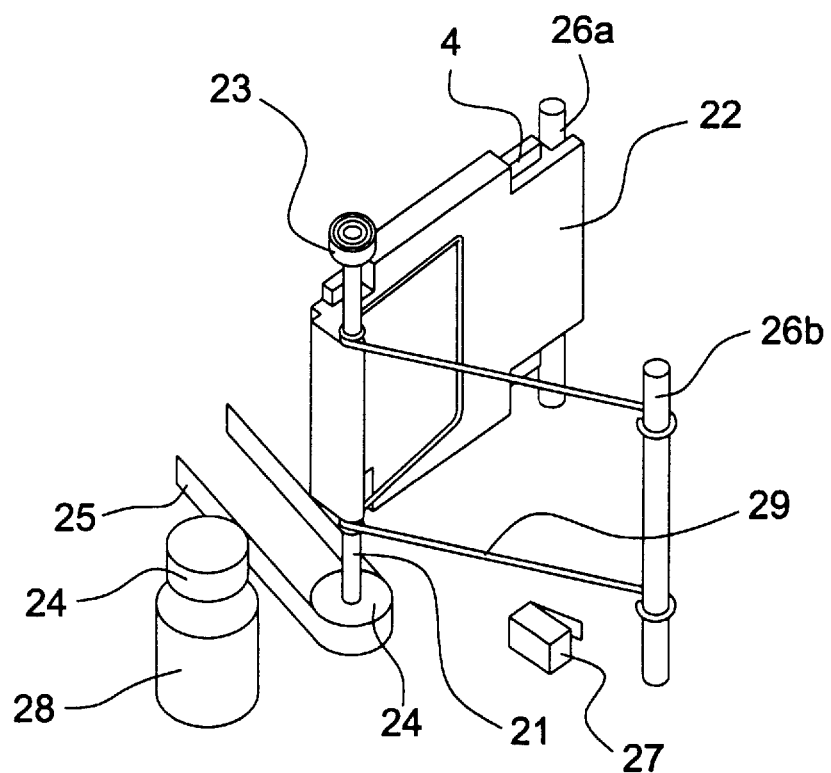
FIG. 4 is an orthogonal view of a mechanism for switching light paths by rotational movement of reflection mirrors used in the third embodiment of the present invention.

FIG. 4 is a perspective view showing a mechanism for switching the light path using rotational movements of the movable mirrors 4 and 5 in FIG. 3. In FIG. 4, a rotational shaft 21 is rotatably held via a bearing 23 in a casing (not shown), and a mirror is fixed on a mirror mounting frame 22 fixed on this rotational shaft. A gear 24 is fixed on an end of the rotational shaft 21 where the rotational shaft 21 for each of the movable mirrors 4 and 5 is connected and is moved together by a belt 25. Position adjustment members 26a and 26b are fixed in the casing 10. The mirror mounting frame 22 is pushed against a position adjustment member 26a by a spring 29. Switch 27 detects the position of the mirror. The gear 24 of motor 28 is connected to the belt 25 to accomplish the switching actions.

FIG. 4 shows a motor connected to a drive belt for accomplishing the switching actions. However, instead of using the belt 25, it would not be beyond the scope of the present invention to use a gear train, a link mechanism, direct connection, or the like. Moreover, the two movable mirrors can be operated automatically (i.e., upon detection of film F (by a sensor such as FIG. 1, sensor 31)) and/or manually.

Embodiment 4

Figure 5:
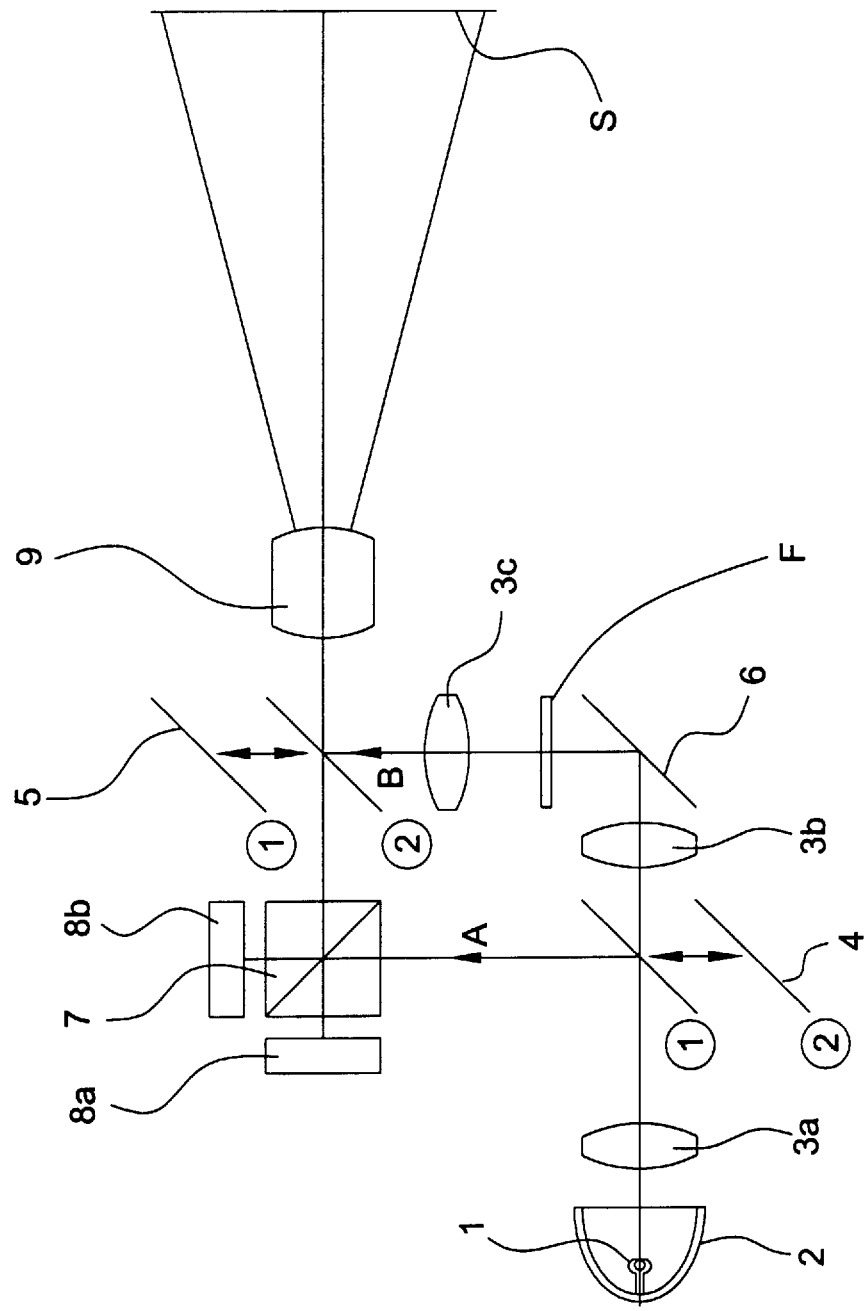
FIG. 5 is a side schematic view of an optical system of a fourth embodiment of the present invention.

FIG. 5 is a schematic view of an optical system of the fourth embodiment of the present invention. When the device is used as a video projector, light emitted from the light source 1 becomes substantially collimated light after being reflected by the reflection mirror 2 through the relay lens 3a. The light is then reflected by the movable mirror 4 set at the position indicated as (1) to follow the light path A. Light transmitted through, or reflected by, the polarized beam splitter 7 is modulated and reflected by the SLMs 8a and 8b. The light is then reflected by, or transmitted through, the polarized beam splitter 7 and projected to the screen S by the projection lens 9 (the movable mirror 5 is set at the position indicated as (1)).

When the device is used as a slide projector, the movable mirror 4 is moved away from the light path by setting it at the position indicated as (2). The light reflected by mirror 6 after passing through the relay lens 3b is transmitted through a photographic (slide) film F and follows an optical path B through a relay lens 3c. The light is then reflected by the movable mirror 5 set at the position indicated as (2) and projected to the screen S by the projection lens 9.

In this case, since relay lenses 3b and 3c are provided, unlike Embodiment 3, the optical distance from the projection lens 9 to the SLMs 8a/8b and the optical distance from the projection lens 9 to the film F do not have to be equal. Moreover, the optical distance from the light source 1 to the SLMs 8a/8b and the optical distance from the light source 1 to the film F do not have to be equal. Therefore, the degree of freedom for designing increases, and the device can be more compact. Furthermore, by providing relay lenses 3b and 3c, the most appropriate optical system can be used when the device is used as a video projector and when the device is used as a slide projector.

Embodiment 5

Figure 6:
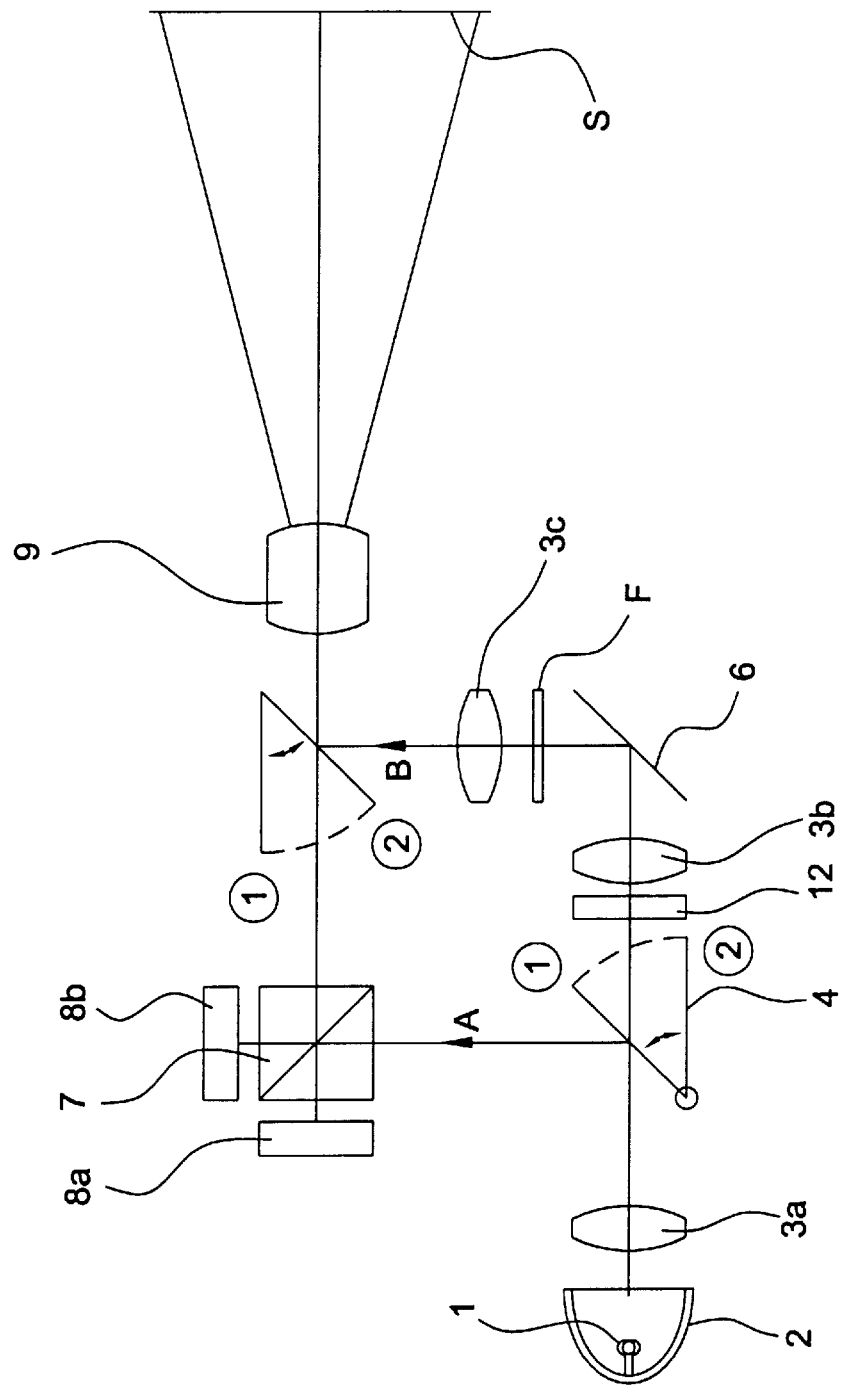
FIG. 6 is a side schematic view of an optical system of a fifth embodiment of the present invention.

FIG. 6 is a side schematic view of an optical system of a fifth embodiment of the present invention. Relay lenses 3b and 3c are added to the optical system of Embodiment 3 (FIG. 3), and an ND (neutral density) filter 12 is additionally provided between the movable mirror 4 and the relay lens 3b. By decreasing light efficiency of the optical system of the slide projector using ND filter 12, the difference in brightness when switching from the function of video projector to the function of slide projector can be reduced. Moreover, damaging the film F by allowing excessive amounts of light to enter the film F can be prevented.

A converting filter 13 for color temperature can be provided instead of the ND filter 12. This corrects the color tone of the images by changing the color temperature of the light source 1. The amount of light from the light source 1 is also decreased so that the brightness of the images does not change greatly when switching from the function of video projector to the function of slide projector. Electricity savings are realized with this structure and heat generated from the optical system can be controlled.

As described above, according to the present invention, a device that operates as a video projector and as a slide projector can be provided. The video projector and the slide projector can be controlled at the same time, resulting in an easy to use device that requires little space. Moreover use of a scanner is not required, and photographic films can be used as they are, without losing their superiority in resolution and reproductivity.

All of the disclosed embodiments include a controller, such as, for example, a microprocessor, CPU, etc. (or hardwired logic (e.g., an ASIC)) that controls the overall operation of the projector. Moreover, all embodiments preferably include a switch 31 or other sensing device that senses the presence (or absence) of film in the projector. The controller receives the signal from film detector switch 31 and causes the other components to change states based on the signal from the switch 31. For example, the controller drives the motors that cause the mirrors 4,5 to move (rotate, slide, etc.), controls the SLMs 8a/8b to switch between their full and modulated states, supplies the video signal to the SLMs 8a/8b when in the video mode, and controls focusing of the various lenses when necessary.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A projector that projects video information and film information, comprising:
   a projector housing;
   a video optical system located in the housing and projecting an image from video information, and including a reflection type spatial light modulator;
   a film optical system located in the housing and projecting an image from a film; and
   a switching device located in the housing and switching between projecting an image from said video information using said video optical system and projecting an image from said film using said film optical system.

2. The projector according to claim 1, further comprising a film holding device located in the film optical system.

3. The projector according to claim 2, wherein said switching device includes a film detector that detects the presence of film in the film holding device, said switching device causing the reflection type spatial light modulator which is shared by said video optical system and said film optical system to achieve a reflected state when said film detector detects film in the film holding device.

4. The projector according to claim 3, wherein said switching device causes said reflection type spatial light modulator to operate in a modulated state, responsive to a video signal, when said film detector does not detect film in said film holding device.

5. The projector according to claim 1, further comprising at least one relay lens located in the housing and having an adjustable focal point.

6. The projector according to claim 1, further comprising a projection lens located in the housing and having an adjustable focal point.

7. The projector according to claim 1, further comprising a light source and a projection lens in said projector housing, said light source and said projection lens being shared by said video optical system and said film optical system.

8. A projector that projects video information and film information, comprising:

a projector housing;

a video optical system located in the housing and projecting an image from video information;

a film optical system located in the housing and projecting an image from a film;

a switching device located in the housing and switching between projecting an image from said video information using said video optical system and projecting an image from said film using said film optical system; and at least one movable mirror, said switching device moving said at least one movable mirror between first and second positions, respectively, to cause the image to be selectively projected using either of the video optical system and the film optical system.

9. A projector that projects video information and film information, comprising:

a light source that projects a light beam;

a video optical system that receives said light beam and projects an image from video information using said light beam;

a film optical system that receives said light beam and projects an image from a film using said light beam;

a switching device that switches said projector between a first mode in which an image is projected from the video optical system using the video information and a second mode in which an image is projected from the film optical system using the film; and at least one movable optically reflective element that is movable between a first position, where said light beam is directed through said film optical system, and a second position, where said light beam is directed through said video optical system.

10. A projector that projects video information and film information, comprising:

a light source that projects a light beam;

a video optical system that receives said light beam and projects an image from video information using said light beam;

a film optical system that receives said light beam and projects an image from a film using said light beam, wherein an ND filter is provided in the film optical system to control the image brightness of projected film information; and a switching device that switches said projector between a first mode in which an image is projected from the video optical system using the video information and a second mode in which an image is projected from the film optical system using the film.

11. The projector according to claim 9, wherein a converting filter for color temperature is provided in the film optical system.

12. The projector according to claim 9, further comprising a projection lens that is shared by said video optical system and by said film optical system.

13. The projector according to claim 12, wherein said switching device includes a film detector that detects the presence of film in the film holding device, said switching device causing a reflection type spatial light modulator shared by said video optical system and said film optical system to achieve a reflected state when said film detector detects film in the film holding device.

14. The projector according to claim 13, wherein said switching device causes said reflection type spatial light modulator to operate in a modulated state, responsive to a video signal, when said film detector does not detect film in said film holding device.

15. The projector according to claim 9, further comprising a film holding device located in the film optical system.

16. A projector comprising:

a projector housing;

a video optical system, located in the housing, and including means for projecting an image from video information;

a film optical system, located in the housing, and including means for projecting an image from film; and switching means, located in the projector housing, for switching between projecting an image from the video information and projecting an image from the film, and including at least one movable optically reflective element.

17. The projector according to claim 16, wherein the at least one movable optically reflective element includes two rotatable optically reflective elements.

18. A projector comprising:

a projector housing;

a video optical system, located in the housing, and including means for projecting an image from video information;

a film optical system, located in the housing, and including means for projecting an image from film; and switching means, located in the projector housing, for switching between projecting an image from the video information and projecting an image from the film, wherein the switching means comprises a reflection type spatial light modulator that is switchable between a reflected state to reflect an image projected from the film and a modulated state responsive to said video information.

19. The projector according to claim 18, wherein said switching means includes means for detecting film in said projector housing, said switching means switching said reflection type spatial light modulator to said reflected state when the film is detected in said projection housing.

20. The projector according to claim 16, further comprising a light source and a projection lens in said projector housing, said light source and said projection lens being shared by said video optical system and said film optical system.

21. A projector comprising:

a projector housing, a video optical system, located in the housing, and including means for projecting an image from video information;

a film optical system, located in the housing, and including means for projecting an image from film; and switching means, located in the projector housing, for switching between projecting an image from the video information and projecting an image from the film, wherein a converting filter for color temperature is provided in the film optical system.

22. A method for projecting video information and images from film using a single projector, comprising the steps of:

providing a projector housing with a video optical system capable of projecting an image from video information and with a film optical system capable of projecting an image from film; and selectively projecting the image from video information and the image from film and changing a position of at least one reflective optical member.

23. A method for projecting video information and images from film using a single projector, comprising the steps of:

providing a projector housing with a video optical system capable of projecting an image from video information and with a film optical system capable of projecting an image from film;

selectively projecting the image from video information and the image from film; and wherein the step of selectively projecting the image from video information and the image from film includes switching a reflection type spatial light modulator between a reflected state to project an image from the film and a modulated state to project an image from the video information.

24. The method according to claim 22, wherein the step of selectively projecting the image from video information and the image from film includes using a single light source and a single projection lens for the video optical system and the film optical system.

* * * * *